Oct. 21, 1952 W. P. OEHLER 2,614,377
DISK HARROW ANGLING ARM
Filed Aug. 28, 1948 2 SHEETS—SHEET 1

INVENTOR.
WILLIAM P. OEHLER
BY
ATTORNEYS

Oct. 21, 1952 W. P. OEHLER 2,614,377
DISK HARROW ANGLING ARM
Filed Aug. 28, 1948 2 SHEETS—SHEET 2

INVENTOR.
WILLIAM P. OEHLER
BY
ATTORNEYS

Patented Oct. 21, 1952

2,614,377

UNITED STATES PATENT OFFICE 2,614,377

DISK HARROW ANGLING ARM

William P. Oehler, Moline, Ill., assignor to Deere & Company, Moline, Ill., a corporation of Illinois Application August 28, 1948, Serial No. 46,687

3 Claims. (Cl. 55—83)

The present invention relates generally to agricultural implements and more particularly to disk harrows of the type shown in U. S. Patent 2,339,124, issued January 11, 1944, to Charles H. White.

The object and general nature of the present invention is the provision of a new and improved frame construction for disk harrows of the type referred to. More particularly, it is a feature of this invention to provide an improved double action disk harrow in which the front and rear gangs are connected together by new and simplified linkage which constitutes an improvement over the construction shown in the above-mentioned White patent. More specifically, it is a feature of this invention to provide an angling arm for each of the front and rear disk gangs which also serve, first, as a reenforcing brace for the inner end of the associated gang frame and, second, as a support for the associated upthrust-resisting spring means. Further, it is a feature of this invention to provide new and improved angling linkage between the front and rear gangs which is so constructed and arranged that right and left hand parts are eliminated, both front angling arms being identical and likewise the rear angling arms are identical. This materially facilitates the manufacture and assembly of the harrow.

These and other objects and advantages of the present invention will be apparent to those skilled in the art after a consideration of the following detailed description, taken in conjunction with the accompanying drawings, in which.

Figure 1:
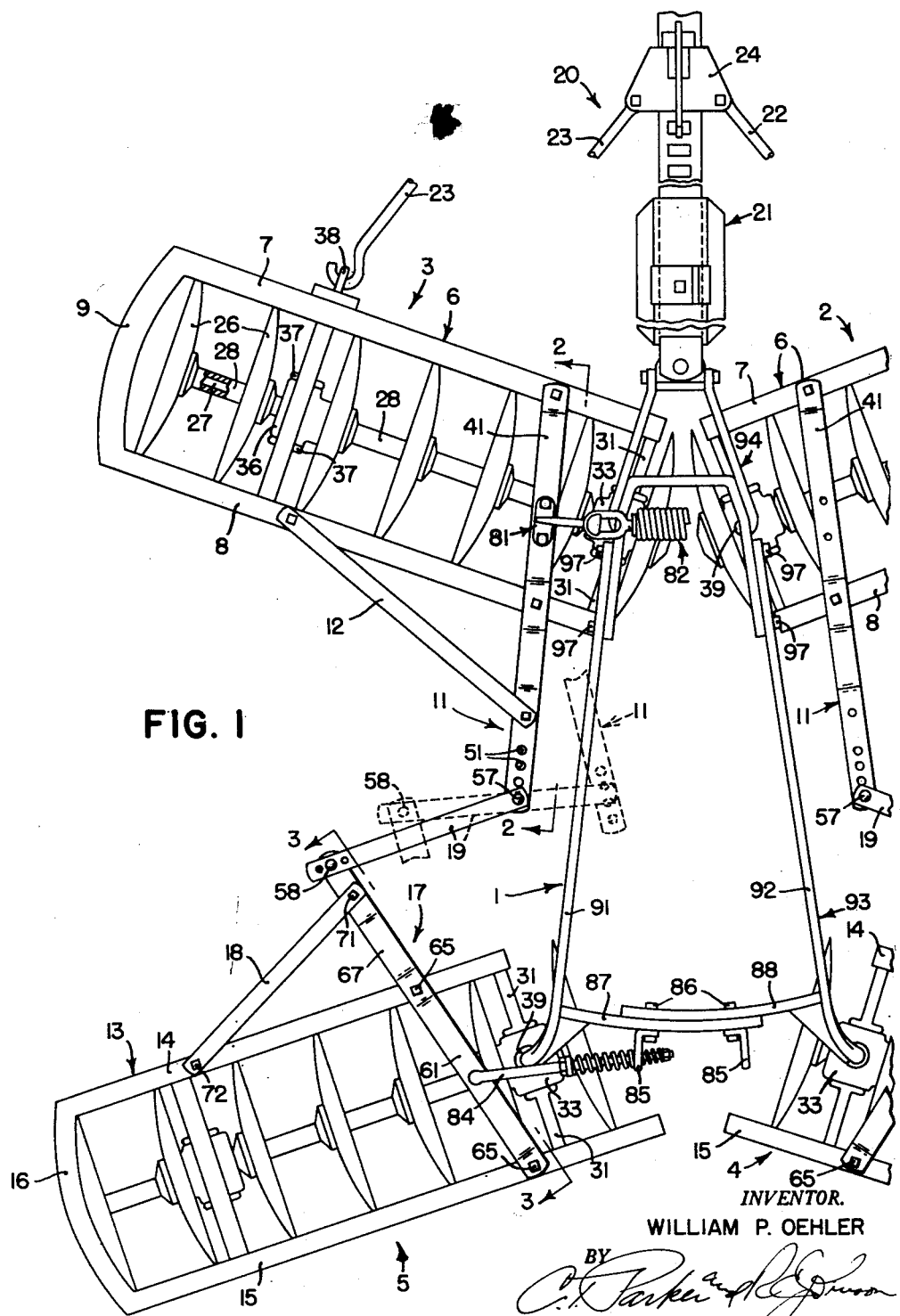
Figure 1 is a partial plan view of a tandem disk harrow in which the principles of the present invention have been incorporated.

Referring first to Figure 1, the disk harrow in which the principles of the present invention have been incorporated is of the type shown and claimed in the above mentioned patent and includes a main frame 1 to the forward portion of which a pair of right and left disk gangs 2 and 3 are swingably connected. A pair of rear right and left hand gangs 4 and 5 are swingably connected with the rear portion of the frame 1. Each of the front gangs includes a gang frame 6 having front and rear angle bars 7 and 8 connected together at their outer ends by an end section 9 and at their inner ends by an angling arm and brace member 11. The rear portion of the latter is reenforced by a brace 12 extending from the rear end of the arm 11 outwardly and forwardly to the outer end portion of the rear angle 8. Similarly, each of the rear disk gangs 4 and 5 includes a frame 13 which is made up of a front angle 14, a rear angle 15, an outer end section 16 and a combined brace and angling arm 17 which is reenforced by a brace 18 bolted at its forward end to the forward portion of the member 17 and at its rear end to the outer portion of the associated forward frame angle 14.

The left hand front and rear gangs 3 and 5 are interconnected by a link 19 which is pivotally connected at its forward or laterally inner end to the rear end of the arm 11 and at its outer or rear end to the forward end of the arm 17. A link 19 also connects the angling arms of the front and rear right hand gangs 2 and 4. A hitch 20, of conventional construction so far as the present invention is concerned, is connected with the front end of the frame 1 and the front gangs 2 and 3 and incorporates a main draft structure 21 and rearwardly and laterally outwardly extending angling links 22 and 23, which are pivotally connected at their rear ends to the outer portions of the associated gang frame 6. The forward ends of the links 22 and 23 are connected to a controllable slide 24 movably mounted on the front portion of the main draft member 21. Fore and aft movement of the slide 24, relative to the front portion of the draft bar 21, serves to shift the front gangs 2 and 3 into and out of angled working position, and when the harrow is turned the lateral swinging of the drawbar structure 21 acts through the links 22 and 23 to reduce the angle of the disk gang on the inside of the turn and increase the angle of the disk gang on the outside of the turn, thereby to facilitate making the turn.

Each of the front and rear gangs 2, 3 and 4, 5 includes a plurality of disks 26 mounted on a gang bolt 27 and are held in proper spaced relation by spacing spools 28, as in conventional construction. The inner end of each of the front gangs 2 and 3 is provided with a pair of bearing brackets 31 which are bolted at their upper and outer ends to the front and rear frame angles 7 and 8 and at their inner and lower ends to a bearing structure 33 which receives the spool at the inner end of the front gang bolt 27 on which the disks 26 are mounted. The outer end of each gang bolt 27 is rotatably mounted in an outer bearing 36 fixed to the gang frame 6 by bearing brackets 37. Preferably, the forward portion 38 of each front bearing bracket 37 extends forwardly of the frame angle 7 and is formed to pivotally and swingably receive the rear end of the associated draft link, 22 or 23. Each of the inner bearings 33 is provided with an upwardly extending socket 39 which receives the associated downwardly extending portion of the main frame. The inner bearings 33 and associated parts are so constructed and arranged that the front gangs may swing both in a fore and aft direction and in a vertical direction, as when passing over uneven ground. The rear gangs 4 and 5 are of substantially identical construction, so far as the bearings, disks and bearing brackets are concerned, and hence the same reference numerals have been used for corresponding parts.

Figure 2:
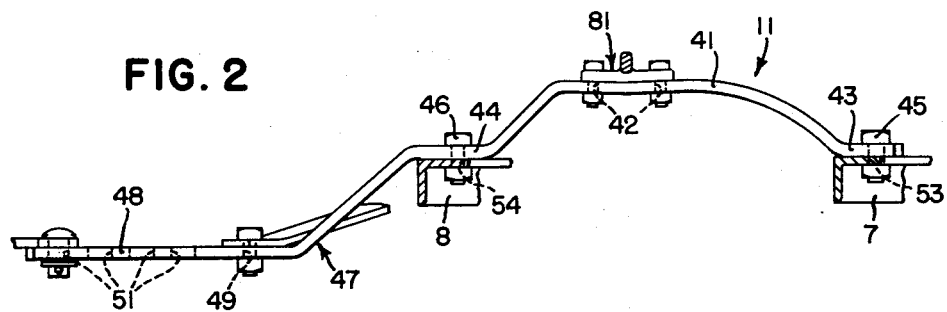
Figure 2 is a generally vertical sectional view taken along the line 2—2 of Figure 1.

Referring now more particularly to Figure 2, the front combined spring support, gang frame brace and angling arm member 11 comprises an upwardly arched section 41 which is centrally apertured, as at 42, and which terminates in front and rear flat portions 43 and 44. The latter portions are apertured to receive bolts 45 and 46 which fasten the member rigidly to the front and rear frame angles 7 and 8. Rearwardly of the arched portion 41 the member 11 includes a downwardly offset portion 47 the rear flat or straight portion 48 of which is provided with a forward aperture 49 and a rear set of four apertures 51. As best shown in Figure 1, it will be seen that the member 11 is symmetrical about its longitudinal vertical plane so that the right and left hand members 11 are identical. The front and rear frame angles 7 and 8 are apertured, as at 53 and 54 to receive the bolts 45 and 46 and the openings 53 and 54 are so placed that when the harrow is in its transport position, with the front and rear disk gangs straightened, the front angling arm members 11, particularly the rear portion containing the plurality of apertures 51, is disposed in a line which is tangent to the arc of movement of the associated connecting link 19 when the latter is disposed in one of the intermediate openings 51, as shown in dotted lines in Figure 1. The forward or laterally inner end of the link 19 is adapted to be pivotally connected to the angling arm section 47 in any one of a number of different positions by means of a bolt 57 which is disposable in any one of the openings 51. A pivot bolt 58 connects the rear or outer end of the link 19 to the forward end of the associated rear angling arm 17.

Figure 3:
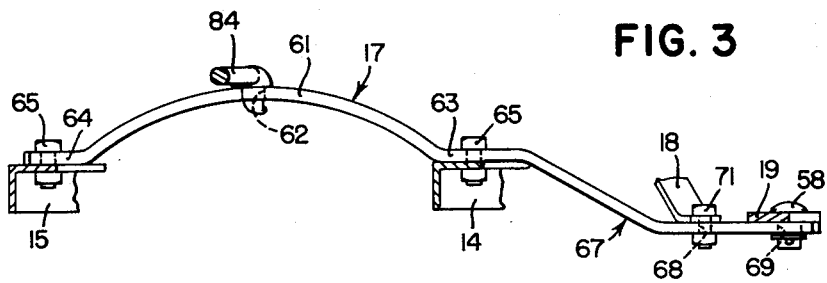
Figure 3 is a sectional view taken along the line 3—3 of Figure 1.

Referring now to Figure 3, the rear angling arm member 17 is constructed similarly to the forward arm member 11. Specifically, the rear angling arm member 17 comprises a rear arched section 61 having a single central aperture 62 and terminating in a forward flat or straight portion 63 and a rear flat or straight portion 64, both apertured to receive bolts 65 and 66 which fasten the arched section 61 to the front and rear frame angles 14 and 15 and the associated disk gang. Forwardly of the arched section 61, the angling arm member 17 includes a downwardly offset portion 67 which is apertured at 68 and 69. The associated rear brace 18 is connected to the offset section 67 by a bolt 71 which passes through the aperture 68. The outer end of the brace 18 is connected by a bolt 72 or the like to the associated front frame angle 14. The other aperture 69 in the downwardly offset portion 67 receives the pivot bolt 58 which connects the outer end of the interconnecting link 19 to the arm member 17. The arm members 17 connected to the right and left hand rear gang frames are of identical construction, being symmetrical about their vertical longitudinal plane, and hence during assembly it is immaterial whether any one arm member 17 is fastened to the left hand gang frame or the right hand gang frame.

The front arch sections 41 of the forward arm members 11 and the rear arch sections 61 of the rear arm members 17 serve not only as cross braces for the inner ends of the gang frames but also as supports for the spring units acting against the gang frames to prevent upthrust of the gangs due to soil pressure against them. To serve as spring supports, the front arch sections 41 have pairs of apertures 42 spaced apart to receive the bases of a pair of spring brackets 81, the inner or upper ends of which are interconnected across the frame 1 by a tension spring unit 82. The rear arch sections 61 are apertured, as at 62, to receive the outer ends of spring biased rod members 84 which at their inner ends are slidably mounted in brackets 85 which are held in place by bolts 86 which secure the two frame members 87 and 88 together. The members 87 and 88 constitute laterally inwardly directed extensions of a pair of frame bars 91 and 92, which form the rear section 93 of the main frame 1, the forward section 94 of which is releasably connected, as at 97, to the forward end of the rear section 93. The present invention is not particularly concerned with the details per se of the frame construction or the upthrust resisting spring means except to form supports for the latter units.

While I have shown and described above the preferred structure in which the principles of the present invention have been incorporated, it is to be understood that my invention is not to be limited to the particular details shown and described above but that, in fact, widely different means may be employed in the practice of the broader aspects of my invention.

What I claim and desire to secure by Letters Patent is:

1. In a tandem disk harrow of the type having a main frame, pairs of front and rear gangs swingably connected therewith, each gang of the pair of rear gangs including a gang frame having front and rear bars, and means for swinging the front gangs relative to the main frame, interconnecting means connecting the rear gangs with the front gangs comprising a combined angling arm and spring support connected to each pair of the front and rear bars of the rear gangs, each combined angling arm and spring support including a section disposed adjacent the laterally inner ends of the front and rear bars of the associated gang and having, between said bars, an upwardly extended portion, disk gang thrust-resisting spring means connected between the upwardly extending portions of said combined angling arm and spring supports, each of said combined angling arm and spring supports also including a portion forming a generally forwardly directed angling arm portion, each of said combined angling arm and spring supports being symmetrical about a vertical longitudinal plane and each having at the forward end of its angling arm portion a link-receiving aperture disposed in said plane, a pair of bars fixed to the front gangs and extending rearwardly therefrom, a link pivotally connected to the forward end of each of said combined angling arm and spring supports at the opening in said angling portion thereof, and means for pivotally connecting the lateral inner ends of said links with the rear ends of said bars.

2. In a tandem disk harrow of the type having a main frame, pairs of front and rear gangs swingably connected therewith, each gang of the pair of front gangs including a gang frame having front and rear bars, and means for swinging the front gangs relative to the main frame, interconnecting means connecting the rear gangs with the front gangs comprising a combined angling arm and spring support connected to each pair of the front and rear bars of the front gangs, and each combined angling arm and spring support including a section disposed adjacent the laterally inner ends of the front and rear frame bars of the associated gang and having, between said bars, an upwardly extending portion, disk gang thrust-resisting spring means connected with the upwardly extending portion of each of said combined angling arm and spring supports, each of the latter including a portion forming a generally rearwardly directed angling arm, each of said combined angling arm and spring supports being symmetrical about a vertical longitudinal plane and each having at its rear end a link-receiving aperture disposed in said plane, a pair of bars fixed to the rear gangs and extending forwardly, to form a generally forwardly directed angling arm, a link pivotally connected to the forward end of each rear angling arm portion and extending laterally inwardly therefrom, and means for pivotally connecting the inner ends of said links with the combined angling arm and spring supports, respectively, at said apertures in the rear ends thereof.

3. In a tandem disk harrow, frame means, pairs of front and rear disk gangs swingably connected at their inner ends to said frame means, each gang including a gang frame having front and rear bars, a combined angling arm and spring support connected to each pair of front and rear bars and including a section disposed adjacent the laterally inner ends of said front and rear bars and serving as a brace reenforcing said bars, said section including an upwardly extending portion, disk gang up-thrust resisting spring means connected with the upwardly extending portion of each of said brace sections, each combined angling arm and spring support connected with said front gangs including a rearwardly extending angling arm section and each combined angling arm and spring support being symmetrical about a vertical longitudinal plane, and each rearwardly extending arm section having a link-receiving aperture lying in said plane of symmetry, each combined angling arm and spring support connected with said rear gangs including a forwardly extending angling arm section, each rear angling arm and support being symmetrical about a vertical longitudinal plane and each forwardly extending arm section having a link-receiving aperture lying in said latter plane of symmetry, and link means at each side of the harrow interconnecting the forwardly and rearwardly extending angling arm sections at said apertures.

WILLIAM P. OEHLER.

REFERENCES CITED

The following references are of record in the file of this patent:

UNITED STATES PATENTS

| Number | Name | Date |
|---|---|---|
| 2,262,908 | Young | Nov. 18, 1941 |
| 2,339,124 | White | Jan. 11, 1944 |